US006681263B1

(12) United States Patent
King

(10) Patent No.: US 6,681,263 B1
(45) Date of Patent: Jan. 20, 2004

(54) CONTROL OF SOFTWARE OBJECT LIFETIME

(75) Inventor: David A. King, Highland, UT (US)

(73) Assignee: Intel Corporation, Santa Clara, CA (US)

( * ) Notice: Subject to any disclaimer, the term of this patent is extended or adjusted under 35 U.S.C. 154(b) by 845 days.

(21) Appl. No.: 09/052,646

(22) Filed: Mar. 31, 1998

(51) Int. Cl.$^7$ .................................................. G06F 9/44
(52) U.S. Cl. ........................................ 709/315; 707/206
(58) Field of Search ................................ 709/300, 303, 709/315, 310; 707/10, 103, 206

(56) References Cited

U.S. PATENT DOCUMENTS

| 4,912,629 A | * | 3/1990 | Shuler, Jr. .................... 707/206 |
| 5,136,712 A | * | 8/1992 | Perazzoli, Jr. et al. ....... 709/104 |
| 5,931,919 A | * | 8/1999 | Thomas et al. ............. 709/315 |

OTHER PUBLICATIONS (Kwan) Kwan, Doug. "Practical distributed garbage collection for networks with asynchronous clocks and message delay." pp. 406–411, Jun. 1994.*

Internet. "Reference counts", "Counting xPops". www.cs.arizona.edu/xkernel/manual/subsection3_12_2.html, Feb. 21, 1996.*

(Chappell) Chappell, David. "Understanding ActiveX and OLE", p. 51–52, Sep. 1996.*

(Vanderburg) Vanderburg, Glenn. "Tricks of the Java Programming Gurus", Jul. 1996.*

Microsoft Corporation, The COM Specification. Chapter 3. Objects and Interfaces, (1995), pp. 1–23.

* cited by examiner

*Primary Examiner*—John Follansbee
*Assistant Examiner*—Lewis A. Bullock, Jr.
(74) *Attorney, Agent, or Firm*—Trop, Pruner & Hu, P.C.

(57) ABSTRACT

A software object's lifetime may be controlled to allow it to complete certain tasks asynchronously after all references to the object have been released. The object may be created in a first state and transitioned to a second state under certain circumstances. For example, if it is known that the object needs to complete certain tasks asynchronously after all references to the object have been released, the object may be transitioned to the second state. If the object is created in a technology which uses reference counting, the reference count may be artificially incremented upon state transition. After the object transitions from the first state to the second state, and all references to the object have been released, the object is so notified and if appropriate, the object can undertake certain tasks appropriate under those circumstances.

22 Claims, 3 Drawing Sheets

CONTROL OF SOFTWARE OBJECT LIFETIME

BACKGROUND

This invention relates generally to object oriented software programs for computer systems and particularly to the control of the lifetimes of software objects.

There are number of object oriented software technologies including COM, C++ and Java, for example. A COM object, for example, is a piece of software with data and one or more interfaces, each with one or more methods. A method is a function or procedure accomplished by an object. An interface allows a client to access a method contained in an object by acquiring pointers to the object's methods.

Microsoft's COM programming technology makes use of reusable component software which is programming language independent. Thus, COM objects can be developed in any object oriented programming language. To use a COM object, client software must start an object by causing an instance of that object to execute. Thus, a client may start a large number of software objects which may be used for a period of time. Since objects include methods and data, they unnecessarily use up memory. Therefore it is desirable to delete these objects when they are no longer useful. The act of deleting the objects, sometimes called freeing the object, simply eliminates the instance of the object.

In COM technology, reference counting is used to determine when an object will stop executing. This in effect determines what is called the object's lifetime, which extends from the point when it is instantiated to the point when it is deleted. Reference counting is implemented by an interface called IUnknown and its methods AddRef and Release.

A client may start an object, acquire interface pointers to the object's interfaces, and then pass those interface pointers on to other clients which may in turn pass them on to still other clients. If the first client were to delete the object when the first client was done with the object, the other clients may not be able to complete their use of the object. One client generally does not know when the other clients are done with an object. Thus, the object keeps track of when each client is finished with it using reference counting. Reference counting in COM involves maintaining a 32 bit reference count, stored in system memory.

Whenever an interface pointer is passed to a new client, the object adds one to its reference count. A client that receives an interface pointer from a client must invoke the add reference method ("call AddRef on the pointer") using the pointer. The referenced object then increments its reference count. Generally, in COM technology, it is the client that invokes AddRef and Release. When the client is done with the interface pointer, it is must call Release on that pointer. This causes the object to decrement its counter.

Thus, in COM technology, an object self-destructs, deletes itself or frees itself when its reference count is zero. In this way, the reference count determines the object's lifetime.

In COM technology, artificial reference counting allows the reference count to be artificially incremented to prevent inadvertent deletion of the object. See COM Specification, Microsoft Corporation (1995), Chapter 3, Section 1.3, available at www.microsoft.com (hereinafter the Microsoft COM Specification). The Microsoft COM Specification indicates that an implementation of a method may invoke functions which have a chance of decrementing the reference count, causing the object to release before the function returns to the object. This would cause a crash. One way around this is to insert an AddRef at the beginning of the method which is paired with a Release just before returning:

```
void IInterface: :FOO(Void) {
    this →AddRef ( ) ;
    /*
    *Body of Foo, as before except short-circuit returns
    * need to be changed.
    */
    this→Release ( ) ;
    return;
}
```

This use of artificial reference counts guarantees object stability while processing is done, according to the Microsoft COM Specification.

However, the artificial reference counting techniques described in the Microsoft COM Specification do not give considerable flexibility. The object's lifetime is effectively determined synchronously because once the program reaches the inserted Release, the reference count is decremented and the object will be deleted, regardless of whether the object was able to complete all necessary tasks. This could be a substantial problem in a number of instances which involve asynchronous tasks. An example of an asynchronous task would be terminating a remote network connection, which may take an indeterminant amount of time. The object may need to wait for a response from the remote network (which response time may be determined by various network conditions).

Another system for determining object lifetimes is provided by the Java software which does not use reference counting but instead uses what is somewhat inelegantly called a "garbage collector". From time to time, the garbage collector examines objects to determine whether there are any remaining references from clients to that object. When all of those references have been released, the garbage collector deletes the object. Thus, it may be that the garbage collector realizes that the object is no longer referenced and deletes the object at an inopportune time. The object may, for example, be attempting to complete a task when it is deleted. The client may well expect incorrectly, that the object, while no longer referenced, will complete certain necessary tasks after its reference has been released.

Thus, there is a continuing need for software technologies which enable flexible control of object lifetimes.

SUMMARY

In accordance with one aspect, a method of controlling the lifetime of an object shared by multiple clients in a computer system involves deleting the object if the object is in a first state when all client references to the object are released. The object is preserved if it is in a second state when all client references to the object are released.

In accordance with another aspect, a method for controlling an object's lifetime in a computer system may include notifying the object when all clients have released the object. Thereafter, the object is deleted.

DETAILED DESCRIPTION

The lifetime of software objects may be controlled asynchronously in a variety of object oriented software languages and technologies. This would include, without limitation, C++, COM, ActiveX, Java, and Visual Basic. When a client in any object oriented technology no longer wants or needs an object, it may release its reference to that object. This may or may not mean that the client expects the object to continue to perform some task on its own, but generally suggests that the client will not again invoke the object's interfaces or functions. Thus, the term "reference" is used herein to refer to the invocation by a client of an object's functions.

Figure 1:
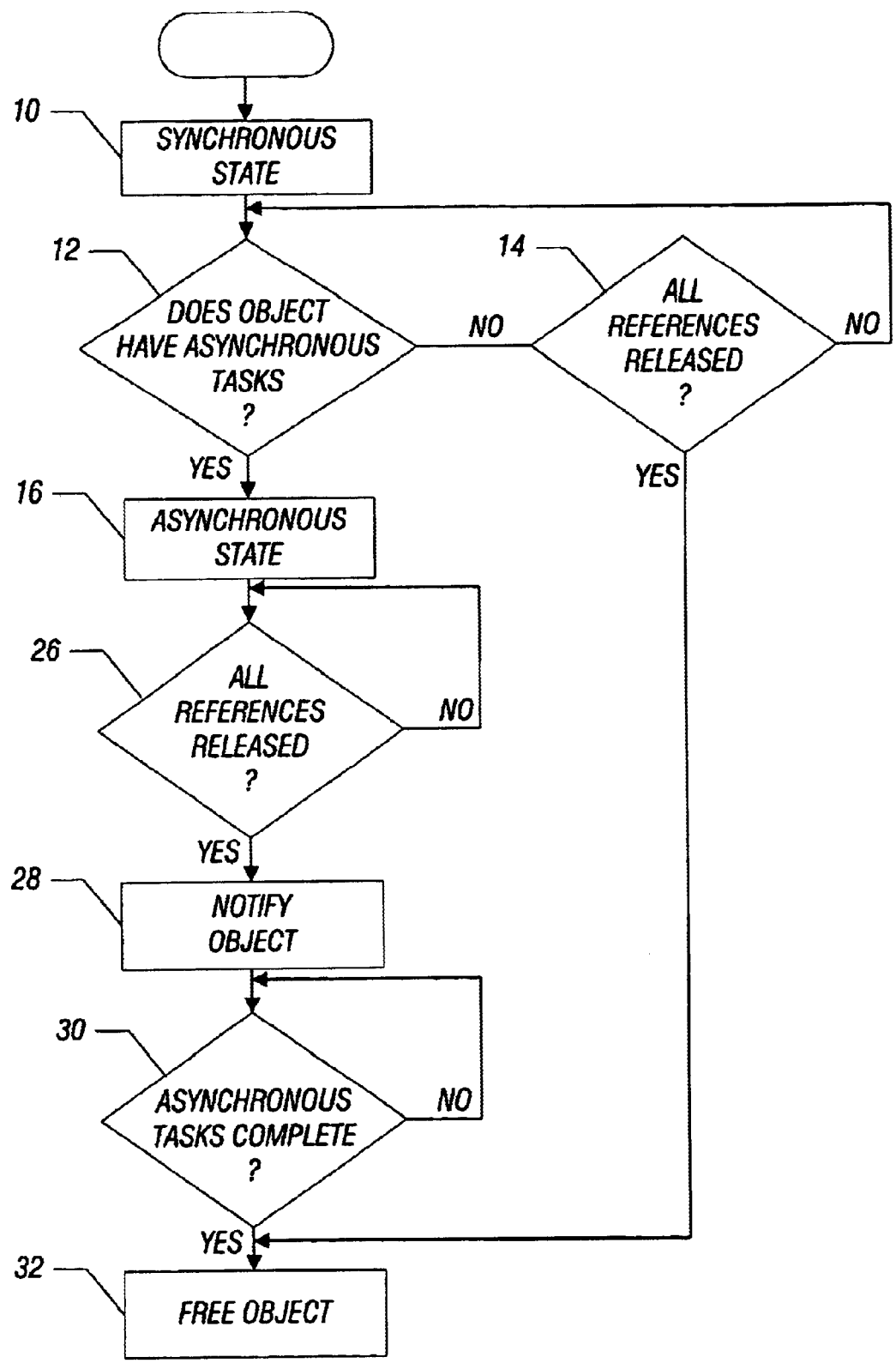
FIG. 1 is a flow diagram for one embodiment.

Referring now to FIG. 1, initially an object is in the synchronous state (block 10) which means that its lifetime will be determined by the standard techniques provided by a given technology. In the case of COM technology, this would involve reference counting.

In diamond 12, a decision is made as to whether the object has an asynchronous task to perform. An asynchronous task would be any task that may not complete in a set, determinable time frame. One example of an asynchronous task would be an operation which requires terminating a remote network connection. The time duration for this task cannot necessarily be determined because it is a function of what is going on at the remote location. The object may need to run code to shut down the network connection, after all references to the object have been released, but the amount of time necessary to accomplish this function may not be determinable.

If the object does not have any asynchronous tasks to perform, a check is made at diamond 14 to determine whether all references have been released. If not, the object's lifetime continues. If all references have been released, the object is deleted using the conventional techniques for deleting objects in the given technology.

If asynchronous tasks are involved, as indicated at block 16, the object is placed in the asynchronous state. The object's state is typically determined by a tag or flag. The flag indicates which of the two states the object is in. At diamond 26, a check is made to determine if all references to the object have been released. If not, the object's lifetime is continued. If all references have been released, the object is notified, as indicated at block 28.

The notification to the object that all references have been released may be important. The object may need to know that all references have been released because it may need to take certain action at that point. While in some technologies this may involve actually having the object notify itself that all references have been released, the step of notifying the object of the release of all references allows the object to undertake tasks necessary at that point. For example, the object may need to take steps to terminate a given connection after all references to the object have been released. Next at diamond 30, a check is made to determine whether the asynchronous task has been completed and if so, the object is deleted. If not, the object's lifetime is continued.

The provision of two lifetime states allows the object's lifetime to be determined differently depending on the circumstances. This allows considerable flexibility in determining object lifetime to best meet the needs and functions which the software is implementing rather than having lifetime determined by rigid, inflexible rules. Further, it allows asynchronous tasks to be completed with certainty without the possibility of inadvertent deletion of the object before the necessary tasks have been completed. One valuable attribute which may be achieved by distinguishing between states is the ability to notify the object under certain circumstances (and not others) when all references to the object have been released. This notification allows the object to take appropriate action under those circumstances.

Figure 2:
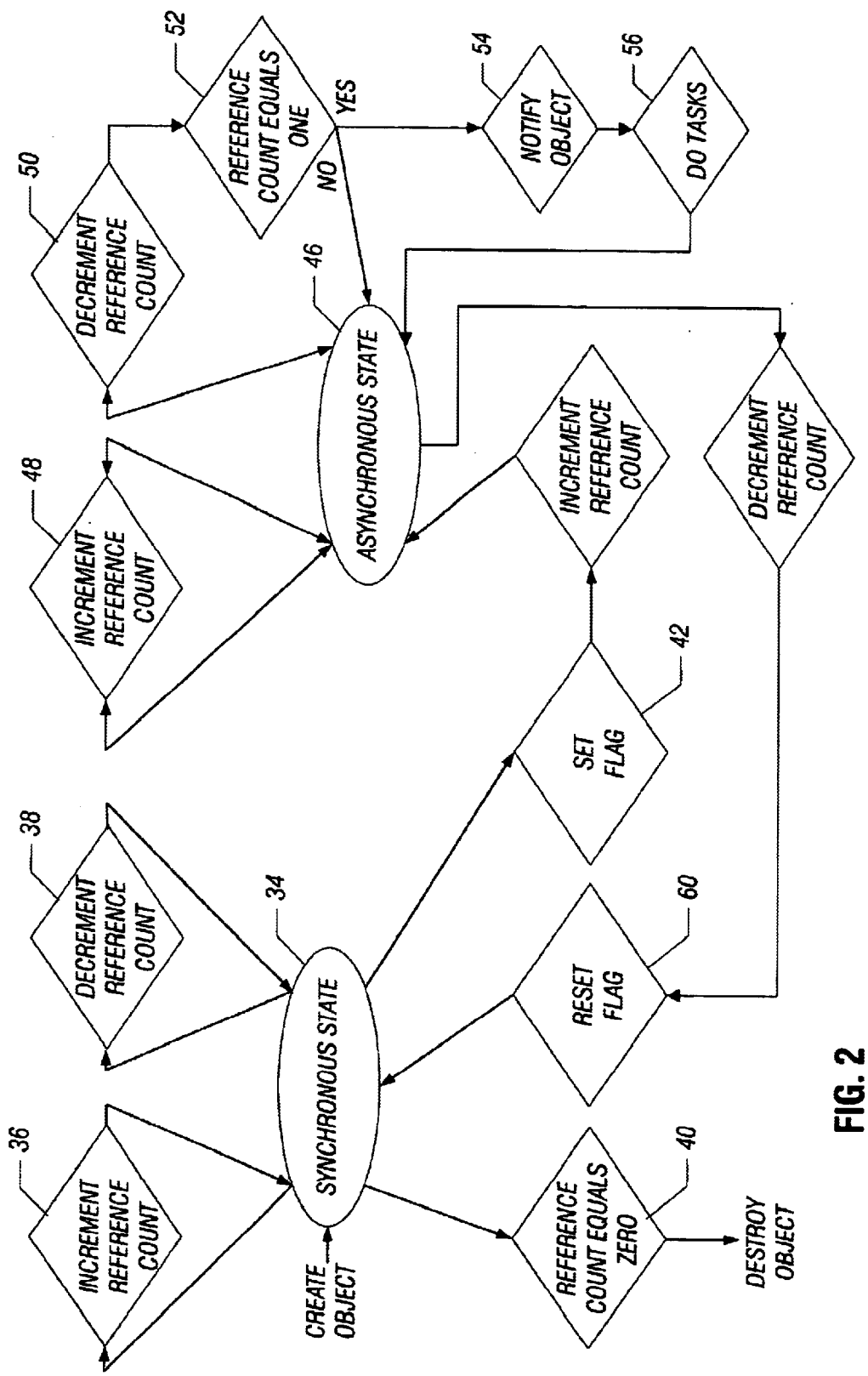
FIG. 2 is a flow diagram for an implementation in accordance with COM technology.

Referring now to FIG. 2, a technique for controlling the lifetime of a COM object in accordance with the methodology shown in FIG. 1, begins with the creation of an object in the synchronous state, as indicated at block 34. Generally, the synchronous state uses the conventional COM technology for controlling object lifetime. For example, when a client references the object, its reference count is incremented as indicated in diamond 36 and when a reference is released, the reference count is decremented, as shown in diamond 38. Likewise, when the reference count equals zero, the object is destroyed, as indicated at diamond 40.

Figure 3:
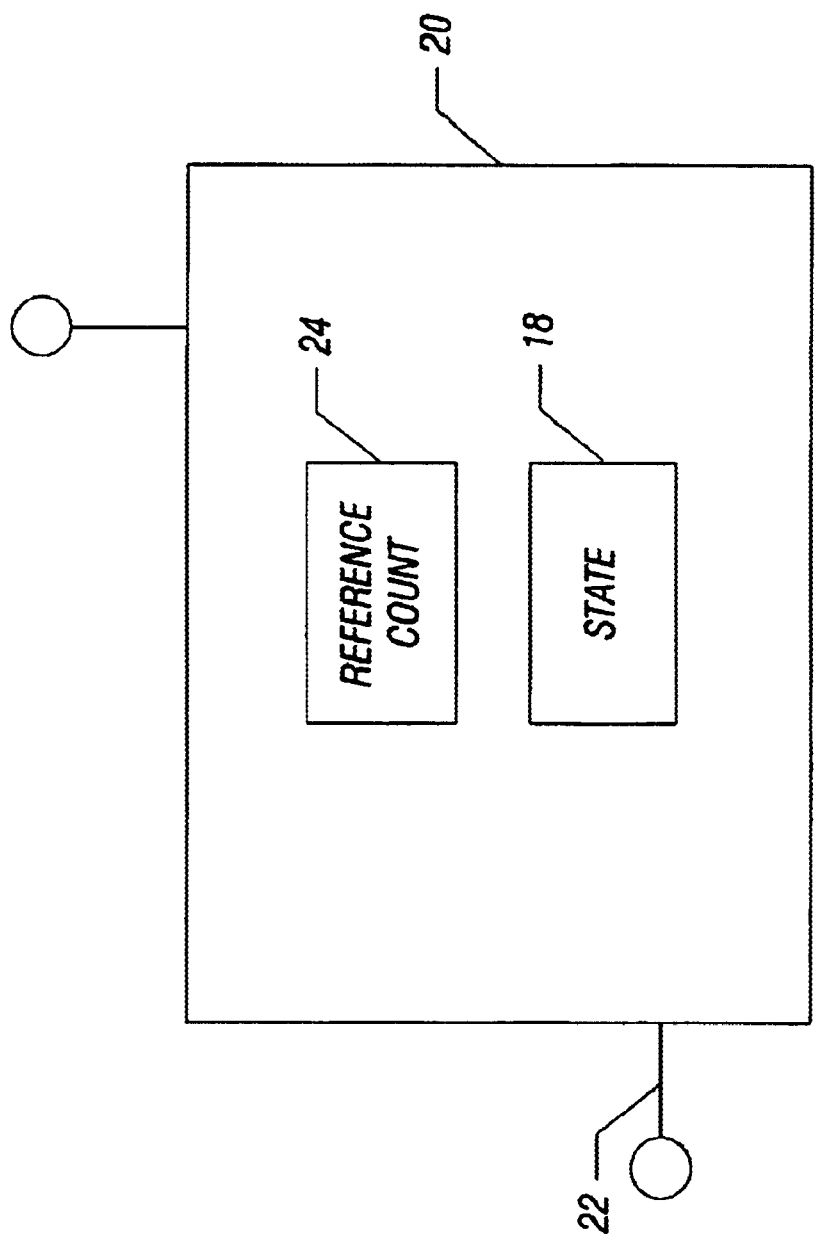
FIG. 3 shows an illustrative COM object useful in connection with the flow shown in FIG. 2.

Information about the state of the object 20 may be contained within the object itself as indicated at 18 in FIG. 3. The reference count 24 may also be stored by the object. The object may include interfaces 22.

Returning to FIG. 2, if it is determined that the object needs to accomplish an asynchronous task, a flag is set, as indicated at diamond 42, the reference count is incremented as indicated at diamond 44, and the object enters the asynchronous state indicated at block 46. Once in the asynchronous state, new references to the object increment the reference count as indicated at diamond 48. Releasing of a reference results in a decrement of reference count as shown at diamond 50 in the conventional fashion.

However, in the asynchronous state, a check is made at diamond 52 to determine whether the reference count equals one. If not, the object returns to the asynchronous state 46. If the reference count equals one, the object is notified as indicated at diamond 54. This would correspond to the condition where all references have been released (because the reference count has been artificially incremented by one at block 44).

By notifying the object that all references to it have been released, the object can then implement its asynchronous tasks, as indicated at diamond 56 which need to be accomplished after the release of all references. The notification of the object indicated at 54 can be implemented by calling a function on the object or the object may itself include the "to do" list of tasks as indicated at block 56. After the asynchronous tasks are completed, the object returns to the asynchronous state, the reference count is decremented, as indicated at diamond 58, the flag is reset, as indicated at diamond 60, and the object returns to the synchronous state 34. The object is then deleted since its reference count, determined at diamond 40, is now equal to zero.

In the implementation shown in FIG. 2, the object operates differently based on its reference count being zero in the synchronous state or one in the asynchronous state. The system knows which state the object is in based on the flag setting. Thus, in the synchronous state, a reference count equal to zero corresponds to the release of all references, while in the asynchronous state, a reference count equal to one corresponds to the release of all references. In the asynchronous state, the additional task of notifying the object can be accomplished, as indicated at 54, to enable the object to then take desired post release of references tasks. Thus, through the system of differentiated states, the object can implement asynchronous activities in a disparate way as necessary.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method of controlling the lifetime of an object comprising:
   when all client references to the object are released, eliminating the object if the object is in a first state;
   when all client references are released, preserving the object if the object is in a second state and notifying the object that all references to the object have been released.

2. The method of claim 1 including implementing certain tasks after the object has been notified that all references have been released.

3. The method of claim 2 including automatically transitioning the object from the second to the first state when all references to the object have been released and certain tasks have been completed.

4. The method of claim 1 including incrementing a reference count when a client references the object and decrementing a reference count when a client releases the object.

5. The method of claim 4 including automatically incrementing the reference count when the object transitions from the first state to the second state.

6. The method of claim 5 including automatically decrementing the reference count when the object transitions from the second state to the first state.

7. The method of claim 1 including setting a flag when the object transitions from the first state to the second state.

8. The method of claim 7 including resetting the flag when the object transitions from the second state to the first state.

9. A method of controlling the lifetime of an object comprising:
   changing a reference count when a client references the object in a first state;
   changing the reference count when a client releases a reference to the object in the first state;
   deleting the object when the reference count is a predetermined value and the object is in the first state;
   changing the reference count when the object transitions to a second state;
   changing the reference count when the object transitions from the second state to the first state; and
   notifying the object when all references to the object have been released if the object is in the second state.

10. The method of claim 9 including implementing certain tasks after the object has been notified that all references have been released.

11. The method of claim 10 including automatically transitioning the object from the second to the first state when all references to the object have been released and said tasks have been completed.

12. The method of claim 9 including setting a flag when the object transitions from a first state to a second state.

13. The method of claim 12 including resetting the flag when the object transitions from the second state to the first state.

14. A method for controlling an object's lifetime in a computer system comprising:
   notifying the object that all clients have released the object; and
   thereafter deleting the object.

15. The method of claim 14 including causing the object to complete certain tasks after the object is notified that all clients have released the object.

16. The method of claim 14 including transitioning the object from a first state to a second state when the object has tasks which must be completed after all references to the object have been released.

17. The method of claim 16 including setting a flag or resetting a flag when the object transitions between states.

18. The method of claim 14 including incrementing a reference count when a client references the object and decrementing the reference count when the client releases the object.

19. The method of claim 18 including deleting the object when its reference count equals zero.

20. The method of claim 19 including creating an object in a first state and setting a reference flag when the object transitions to a second state, notifying the object when all references have been released when the object is in the second state and deleting the object after all references to the object in the second state have been released and the object has been notified that all references have been released.

21. The method of claim 20 including transitioning the object from the second state to the first state when all references to the object have been released and the object has been notified that all references have been released.

22. An article comprising a computer readable storage medium storing instructions that cause a computer to:
   eliminate an object if the object is in a first state when all client references to the object are released; and
   preserve the object if the object is in a second state when all client references are released.

* * * * *